United States Patent Office 2,744,662
Patented May 8, 1956

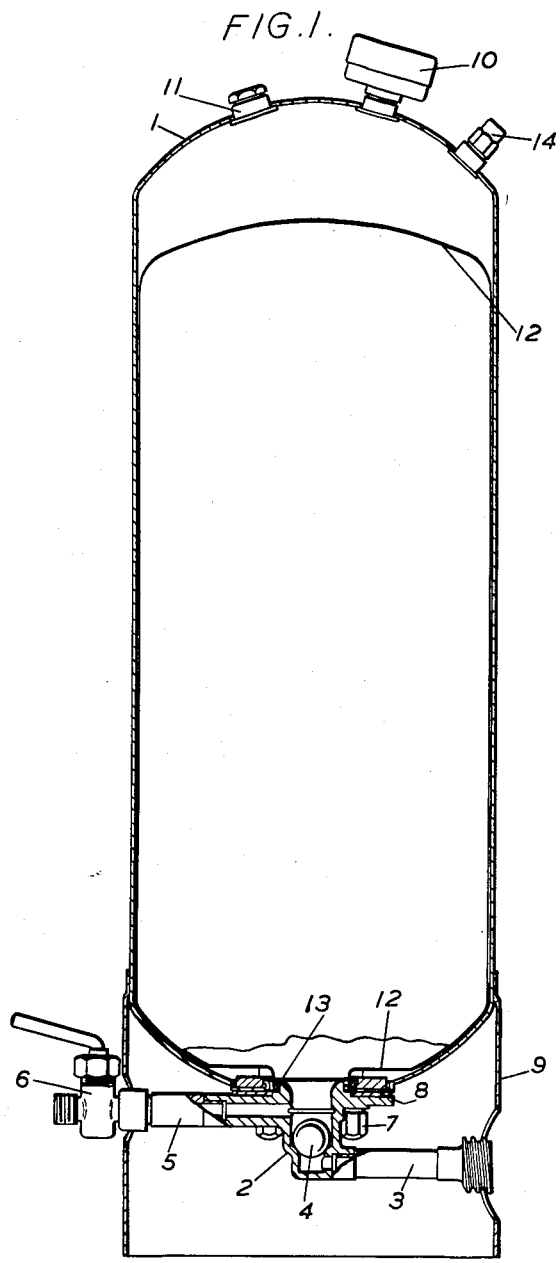

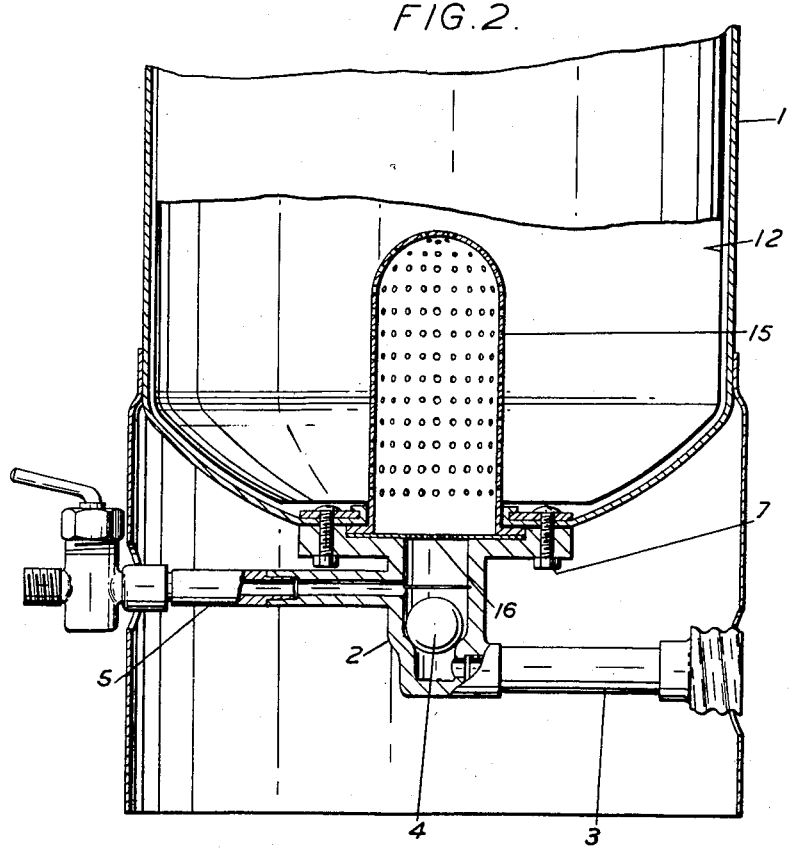

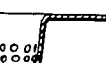
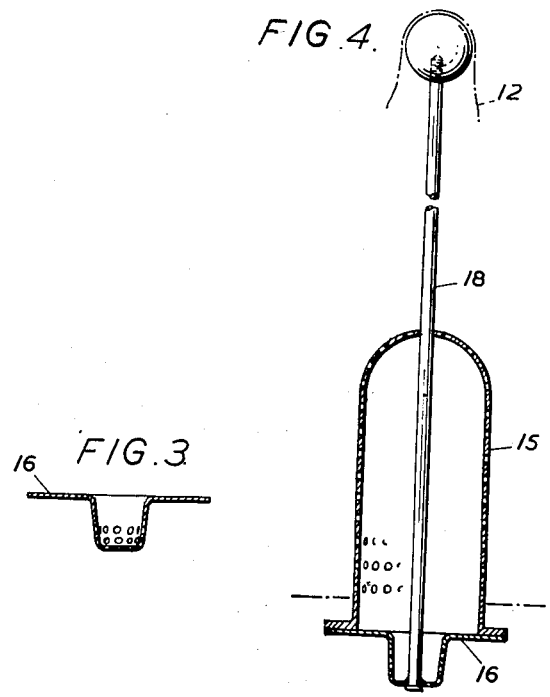
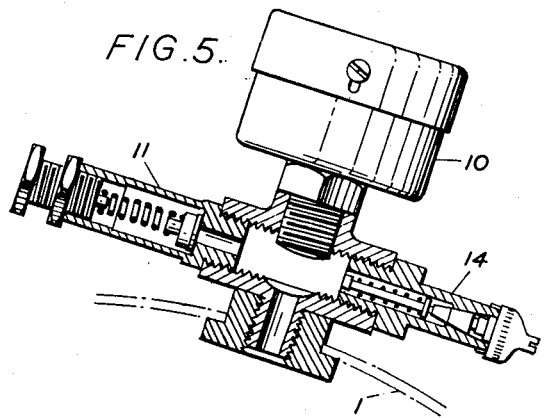

2,744,662

INSECTICIDE—AND LIKE SPRAYING EQUIPMENT

Anthony Pawson Smith and Geoffrey Fletcher, Broadway, Maidstone, England

Application August 3, 1953, Serial No. 372,034

Claims priority, application Great Britain August 7, 1952

3 Claims. (Cl. 222—189)

This invention relates to insecticide spraying equipment, and is concerned with sprayers, known as knapsack sprayers, in which a container for liquid to be sprayed is carried on an operator's back.

It is usual for the liquid containers of sprayers and the like to be made of metal, e. g. aluminium, and the chemicals now coming into use for insecticidal sprays and like purposes react with the metals commonly used so that the containers rapidly wear away and become useless.

The object of the present invention is to overcome the aforesaid defect, and with that end in view the invention consists in a container for liquids used for spraying as insecticides comprising a rigid casing provided with a removable inner lining of material not affected by the liquids, whereby the liquids are kept out of contact with the inner surfaces of the rigid casing. The lining is preferably in the form of a bag, and preferably of flexible material, e. g. rubber, or a synthetic resin such as polythene or polyvinyl chloride. The rigid casing may be of its known form with an opening at one end to which a pipe can be detachably secured for conveying liquid to a spraying nozzle or the like, and the lining may be in the form of a bag of similar shape and dimensions, with a neck adapted to be secured in the outlet opening of the rigid casing when the bag is inside the casing. When liquid is then pumped into the container it fills the bag but nowhere makes contact with the walls of the rigid casing. The end of the rigid casing remote from the liquid outlet is preferably provided with an air inlet non-return valve whereby air or other gas can be forced under pressure into the casing to occupy the space therein exterior to the bag lining. This compressed air serves as the motive power for compressing the bag and ejecting liquid from the outlet to the spraying—or like nozzle upon release of the usual manual control means thereof. The rigid casing may also be fitted with a pressure gauge and/or any other desired instruments, and also with a safety release valve, in known manner.

The invention will be clearly understood from the following description of forms (given, however, merely by way of example) which it may assume, and this description will be more readily followed by reference to the accompanying drawings wherein Figure 1 represents in sectional elevation a knapsack insecticide sprayer incorporating the present invention.

Figure 2 represents the lower part of a knapsack sprayer similar to that as shown in Figure 1, with a modification according to the present invention; and Figures 3, 4 and 5 represent modified details which may be incorporated in knapsack sprayers according to the invention.

In carrying the invention into effect in one convenient manner when applied to the liquid-container of a knapsack insecticide sprayer as shown in Figure 1 of the drawings herewith there is provided a rigid outer casing 1 of metal, e. g. aluminium, of cylindrical form with domed ends substantially as in known devices. One domed end (hereinafter referred to as the lower end) is centrally apertured to receive a valve box 2 in known manner, the valve box having an inlet pipe 3 through which liquid can be pumped into the casing past a non-return ball valve 4, and an outlet pipe 5, provided with a tap 6, through which liquid from the container may be fed, e. g. to a flexible hose having at its free end a spraying nozzle with a manually controlled valve. The valve box 2 is secured to the casing 1 by screws 7, and a sealing gasket 8 may be provided between the box 2 and casing 1. A metal skirt 9 may be fitted to the bottom of the casing 1.

The other (upper) end of the casing 1 may be provided with a pressure gauge 10 communicating with the interior of the casing, and a safety valve 11 adapted to open if pressure inside the casing exceeds a prearranged valve.

A container as described above is substantially of known form. Liquid is pumped into the casing 1, and air under pressure is also pumped in to occupy the upper space of the casing. When the tap 6 is open the compressed air forces liquid out, e. g. to the attached spraying nozzle, as soon as the manually controlled valve thereon is released.

As previously explained some chemicals now used as insecticides react with the metal of casing 1 and rapidly eat it away, and the aim of the present invention is to overcome that difficulty. For that purpose, in the form of the invention shown in the drawing herewith there is provided a flexible bag 12 of cylindrical form and approximately the same transverse external dimensions as the internal dimensions of the casing 1, but somewhat shorter in length. This bag is made of any suitable material inert to the chemicals being used, and may for example be of rubber, or of a synthetic resin such as polythene or polyvinyl chloride. The bag 12 is completely closed except for a neck adapted to fit and be secured at the aperture of the casing 1 which holds the valve box 2. The outer edges of the neck of the bag 12 may be turned out beneath the gasket 8 to provide a firm seal, and if desired an elastic ring 13 may hold the neck of the bag in a groove of the valve box 2 in order further to ensure a tight seal.

It will be apparent that chemicals now pumped into the container are held in the bag 12 and do not contact the walls of the casing 1. It would be possible also to pump air under pressure into the bag 12 in order that liquid can be ejected thereby in the same way as in known devices. If intended for use in this way the bag 12 may be lengthened in order to fit snugly inside casing 1 and not therefore subjected to undue strain.

It is preferred, however, to pump air under pressure into the casing 1 but external to the bag 12. For this purpose the upper end of casing 1 may be fitted with an air-inlet non-return valve 14. The compressed air exerts pressure on the bag 12 and thereby on the liquid therein which is thus forced out through the outlet pipe to a spray nozzle or other delivery point. The bag, when empty, seals the outlet aperture at the valve box 2, and thus makes unnecessary the provision of an internal ball valve in the casing 1, as is provided in known containers. When the bag 12 becomes ruptured the valve box 2 is released, the bag withdrawn, and replaced by a new one which is easily secured when the valve box 2 is refitted. It will be noted that known casings can easily be adapted to incorporate a bag 12 according to the invention without material structural alteration.

In a sprayer such as described above it is sometimes found that as the liquid is ejected there is a tendency for the bag to collapse and to form a crumpled mass fouling or sealing the liquid outlet before all the liquid has been ejected. In order to meet this difficulty according to a modified form of the invention guard means may be provided at or adjacent to the liquid outlet to hold the flexible container or lining away from the outlet and thus prevent, or diminish the danger of, the flexible container or lining fouling or sealing the outlet. The guard means may comprise a cylindrical or globular structure adapted for detachably fitting within the casing over the outlet aperture, and provided with perforations or a gauze-like structure allowing passage of liquid while holding back the flexible container or lining from the casing outlet as it collapses after liquid has been ejected.

One suitable form of such guard means is illustrated in Fig. 2 of the drawings herewith, in which like references apply to the same details as described above. In this modification of the invention there is fitted into the outlet of the casing 1 a perforated metal cylinder 15 having a closed domed inner end and a flange at its other end adapted to ride against the outer wall surface of the rigid casing 1. The neck of the flexible bag 12 projecting out through the outlet is folded back to form a sealing gasket between this flange and the rigid container. The contacting surface of the valve box 2 is recessed to form a seating for the flange of the perforated cylinder 15, and is held to the rigid casing by screws or bolts 7 which pass through the flanges of the valve box and the perforated cylinder, the outturned neck of the bag and the wall of the rigid container. If desired the lower end of the perforated cylinder may be closed by a perforated disc 16 held thereto by the valve box 2 when secured in position. This disc 16 limits the movement of the valve ball 4 and retains it in the valve box. If it is desired further to restrict upward movement of the valve ball 4 a split spring ring may be fitted in a groove of the outlet just above the ball as shown.

From the above description it will be seen that the perforated metal cylinder allows egress of the liquid insecticide in normal manner but being of suitable length serves to hold back the flexible bag from the outlet when the bag tends to collapse and crumple up upon ejection of its liquid contents and in this way keeps the outlet sufficiently clear to allow all the liquid contents within the bag to be satisfactorily ejected.

A modified arrangement for limiting movement of the valve ball 4 which may be incorporated in a sprayer such as described above according to the invention is illustrated in Figure 3 of the drawings herewith. The filter plate 16 is in this case formed with a cylindrical or dish-shaped central projection, of sufficient depth to extend downwards into the outlet of the container until its lower end is adjacent to the valve ball 4 and limits its upward movement. This form of plate 16 eliminates the need to insert the split ring in the outlet (shown in the drawings previously referred to), and thus avoids the necessity to machine a groove in the interior of the outlet for seating the split ring.

It has been found that occasionally (and especially when containers 1 of considerable length are used in devices such as described above) the flexible bag 12 when collapsed by the air pressure upon ejection of the liquid, may tend to become rolled up inside the containers, and during the injection of a fresh charge of liquid the rolled up portions of the bag may become trapped between the lower part of the bag (now filled with liquid) and the casing wall, so that further injection of liquid bursts the bag. A modification of the invention intended to meet this difficulty is illustrated in Figure 4 of the drawings herewith and comprises a rod or tube 18, e. g. of brass, of substantial length fitted to project axially into the casing 1. At the upper end is fitted a screwed-on ball (e. g. of synthetic resin), which forms a seal if the element 18 is a tube. This element extends axially through the metal cylinder 15, and the dished or cylindrical portion of the plate 16, to each of which it may be brazed. The flanges of the cylinder 15 and plate 16 may also be secured together, in order to form a unit for fitting into the casing outlet 2. It will be clear that the element 18 holds up the collapsed bag 12, and keeps it free to receive a full fresh charge of insecticide without becoming folded up or trapped, and subsequently burst.

A further detail modification which may be incorporated in sprayers as above described according to the invention is illustrated in Figure 5 of the drawings herewith. In this modification the pressure gauge 10, safety release valve 11, and air-inlet valve 12 (shown as fitments separately inserted in the upper end of casing 1 in the sprayer shown in Fig. 1 herewith) are combined as a single unit in order that only a single hole needs to be bored in the upper end of casing 1 to receive all three devices. As will be seen this unit comprises a single pipe leading from the pressure gauge 10, with side tappings to which are secured the pipes of the safety valve, and the air-inlet with a spring-loaded non-return valve.

It should be understood that the invention is not restricted solely to details of the form described above which may be modified, in order to meet various conditions and requirements, encountered, without departing in any way from the scope of the invention.

What we claim is:

1. A knapsack sprayer for insecticidal liquids comprising a rigid outer casing having an outlet at one end, a flexible bag adapted to fit inside said casing and having an outlet neck detachably secured in said casing outlet, a liquid inlet pipe communicating with said casing outlet and fitted with a non-return valve through which said bag may be filled with liquid, a liquid outlet pipe communicating with said casing outlet and provided with liquid-flow control means, an air inlet fitted with a non-return valve communicating with the space between the innermost end of said bag and said rigid casing, whereby air can be compressed into and maintained at a super-atmospheric pressure in said space for the purpose of collapsing said bag and ejecting liquid therefrom when said liquid-flow control means are operated to allow liquid outflow, and supporting means of substantial length projecting substantially axially from said casing outlet into the interior of said rigid casing for holding said bag away from said outlet inside said rigid casing when collapsed.

2. A knapsack sprayer according to claim 1 comprising a perforated filter fitted internally of said casing over said outlet, and said supporting means comprising a rod-like element projecting axially inwards from said outlet into said casing, and extending through the innermost end of said filter for a substantial distance.

3. A knapsack sprayer according to claim 1 wherein said liquid inlet and outlet pipes are embodied in a unitary structure, and the neck of said bag projects out of said casing outlet and is turned outwards against the outer surface of said casing and held firmly thereagainst by said unitary pipe structure which is removably secured externally to the walls of said casing at said casing outlet.

References Cited in the file of this patent

UNITED STATES PATENTS

| Number | Name | Date |
| --- | --- | --- |
| 181,680 | House | Aug. 29, 1876 |
| 262,773 | Hohl | Aug. 15, 1882 |
| 1,086,532 | Huss | Feb. 10, 1914 |
| 1,715,335 | Cocks | May 28, 1929 |
| 1,743,056 | Whitaker | Jan. 7, 1930 |
| 1,996,792 | Bystricky et al. | Apr. 9, 1935 |
| 2,097,985 | Maryott | Nov. 2, 1937 |
| 2,198,564 | Robison | Apr. 23, 1940 |
| 2,397,455 | Chmielowiec | Mar. 26, 1946 |
| 2,509,570 | Lee | May 30, 1950 |
| 2,558,181 | Kassel | June 26, 1951 |
| 2,574,931 | Nason | Nov. 13, 1951 |